United States Patent Office 3,536,704
Patented Oct. 27, 1970

3,536,704
SCHIFF BASES OF 4-AMINO-2,2,5,5-TETRAKIS (FLUOROALKYL)-3-IMIDAZOLINES
David M. Gale, Wilmington, Del., assignor to E. I. du Pont de Nemours and Company, Wilmington, Del., a corporation of Delaware
No Drawing. Filed Aug. 10, 1966, Ser. No. 571,396
Int. Cl. C07d
U.S. Cl. 260—240                                    4 Claims

ABSTRACT OF THE DISCLOSURE (1) Schiff bases of 4-amino-2,2,5,5-tetrakis(fluoroalkyl-3-imidazolines and 4-amino-2,2,5,5-tetrakis(fluoroalkyl)-3-oxazolines of the formula

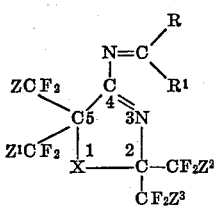

wherein Z, $Z^1$, $Z^2$ and $Z^3$, which may be the same or different, are selected from hydrogen, chlorine and fluorine; R is hydrogen or a monovalent radical containing at most 18 carbons selected from alkoxy, dialkylamino, dialkylaminoaryl and alkoxyaryl; and $R^1$ is selected from R and a monovalent radical containing at most 18 carbons selected from alkyl, aryl, alkaryl and aralkyl; and X is selected from O and NH, aryl being a carbocyclic radical selected from phenyl and naphthyl;

(2) A process for preparing said Schiff bases by reaction of an isocyanate with a carbonyl or thiocarbonyl-containing compound; and (3) Pharmaceutical compositions containing a beneficial amount of the aforesaid Schiff bases.

The compounds of this invention are useful in lowering the formation temperature or pressure of polymers, as dyes and as muscle relaxants.

FIELD OF THE INVENTION

This invention relates to Schiff bases of fluoroalkyl substituted aminoheterocyclics, to a process for their preparation, to pharmaceutical compositions containing a beneficial amount of these Schiff bases and to a process for administering, to a warm-blooded animal, the pharmaceutical compositions to produce a physiological effect.

DETAILS OF THE INVENTION

This invention is directed to Schiff bases of 4-amino-2,2,5,5-tetrakis(fluoroalkyl)-3-imidazolines and 4-amino-2,2,5,5-tetrakis(fluoroalkyl)-3-oxazolines of the formula

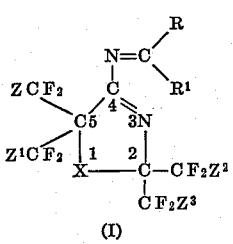

and to a process for producing these Schiff bases. In Formula I, Z, $Z^1$, $Z^2$ and $Z^3$ can be the same or different and are selected from hydrogen, chlorine and fluorine; R is hydrogen or a monovalent radical containing at most 18 carbons selected from alkoxy, dialkylamino, dialkyl- aminoaryl and alkoxyaryl; and $R^1$ is selected from R and a monovalent radical containing at most 18 carbons selected from alkyl, aryl, alkaryl and aralkyl; and X is selected from O and NH. Aryl is a carbocyclic radical selected from phenyl and naphthyl.

This invention is also directed to the process for preparing a Schiff base (I) by the reaction comprising reacting an isocyanate of the formula

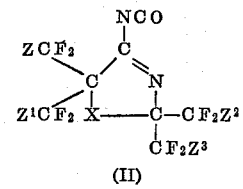

wherein X, Z, $Z^1$, $Z^2$ and $Z^3$ are as defined above with a carbonyl or thiocarbonyl-containing compound of the formula $$Y=CRR^1 \qquad (III)$$

wherein Y is selected from oxygen and sulfur and R and $R^1$ are as defined above.

The process for preparing the Schiff bases of this invention is conducted at a temperature of about 20–250° C. using essentially anhydrous conditions and preferably an inert atmosphere such as nitrogen. Preferably, the reaction is conducted at a temperature of about 155–220° C. Moderate reaction temperatures such as 70–160° C. are also used, especially when the carbonyl or thiocarbonyl reactant is a good reducing agent.

Solvents or diluents which are inert to the reactants and products such as ethers, for example the dimethyl ether of diethylene glycol, or dioxane, or other inert solvents such as chlorobenzene, methylene chloride, tetrachloroethylene, xylene and the like can be used in the process for producing the Schiff bases. The process also can be conducted with excess carbonyl or thiocarbonyl-containing compound as the reaction solvent. A mole ratio of the heterocyclic isocyanate to carbonyl or thiocarbonyl-containing compound of about 1.0:2.0 is preferred. The reaction can be conducted using a mole ratio of reactants of about 0.5:10 or higher.

The products of this invention can be isolated from the reaction mixture by distillation, vacuum sublimation or crystallization.

Schiff bases (I) possess pharmacological activity which is therapeutically useful in the treatment of neurological and psychiatric disorders in warm-blooded animals. The Schiff bases exert depressant effects upon the central nervous system, resulting in a decrease in skeletal muscle tone. This depressant effect is a desirable property for the treatment of hypertonic and hyperkinetic motor disorders. The depressant effect is also useful for producing relaxation during administration of a general anesthesia.

An embodiment of this invention is a pharmaceutical composition containing a physiologically beneficial amount of a Schiff base of Formula I as the active ingredient and a nontoxic pharmaceutical carrier.

The active ingredient of this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.02% by weight based on the total weight of the composition and not more than 99% by weight.

The pharmaceutical carrier can be a sterile liquid such as water and oils, including those of petroleum, animal, vegetable or synthetic origin, for example peanut oil, soybean oil, mineral oil, sesame oil and the like. In general, water, saline, aqueous dextrose (glucose) and related sugar solutions and glycols such as propylene glycol or polyethylene glycols are preferred liquid carriers. Suitable pharmaceutical carriers are described in "Remington's Practice of Pharmacy" by E. W. Martin and E. F. Cook, a well-known reference test in this field.

The dosage administered will be dependent upon age, health and weight of the recipient, the kind of concurrent treatment if any, frequency of treatment, and the nature of the effect desired. Generally, a daily dosage of active ingredient compound will be from about 0.05 to 50 mg. per kg. of body weight, although lower, such as 0.01 mg./kg., or higher amounts can be used. Ordinarily, from 0.1 to 20 and preferably 0.1 to 5 mg./kg. per day, in one or more applications per day, is effective to obtain the desired result.

A process embodiment of this invention comprises administering to a warm-blooded living animal a physiologically beneficial amount of a Schiff base of Formula I or a physiologically beneficial amount of a pharmaceutical composition containing a Schiff base of Formula I and a nontoxic pharmaceutical carrier. The Schiff base can be administered orally and parenterally.

The isocyanates of Formula II are prepared by a series of reactions involving either a fluoroketone or a fluoroketimine which are converted to 4-amino-2,2,5,5-tetrakis(fluoroalkyl) - 3 - oxazolines and 4-amino-2,2,5,5-tetrakis(fluoroalkyl)-3-imidazolines (or their tautomers-4-imino-2,2,5,5'-tetrakis(fluoroalkyl)oxazolines and 4 - imino-2,2,5,5 - tetrakis(fluoroalkyl)imidazolidines, respectively) which are subsequently converted into 4-isocyanato-2,2,5,5 - tetrakis(fluoroalkyl) - 3 - oxazolines and 4-isocyanato-2,2,5,5-tetrakis(fluoroalkyl)-3-imidazolines.

4-isocyanato-2,2,5,5 - tetrakis(fluoroalkyl)-3-oxazolines, the compounds of Formula II in which X is oxygen, are used as a starting material for producing some Schiff bases of this invention. These compounds are prepared by the reaction of a fluoroketone of the formula

(IV)          $ZCF_2\overset{O}{\underset{\|}{C}}CF_2Z^1$ in which Z and $Z^1$ are as defined above with an alkali metal cyanide in a polar solvent to produce the alkali metal salt of the fluoroketone cyanohydrin which is then reacted with a fluoroketimine of the formula

(V)          $Z^2CF_2-\overset{NH}{\underset{\|}{C}}-F_2Z^3$ in which $Z^2$ and $Z^3$ are as defined above. Acidification of the resulting reaction mixture followed by purification yields the 3-oxazoline. This process is described in further detail in Example A and in U.S. Pat. 3,442,904.

4 - amino-2,2,5,5-tetrakis(fluoroalkyl)-3-imidazolines, used for preparing the imidazoline isocyanates of Formula II in which X is NH, are prepared by reacting three moles of a ketimine of Formula V with 1 mole of an alkali metal cyanide, followed by heating the reaction mixture with acid such as concentrated sulfuric acid. Imidazoline intermediates having different Z groups on the 2 and 5 position can be produced from a mixture of fluoroketimines. This latter process produces a mixture of imidazolines. Preparation of 4-amino-2,2,5,5-tetrakis(fluoroalkyl)-3-imidazolines is described in greater detail in Examples B and C and in U.S. Pat. 3,459,766.

4 - isocyanato-2,2,5,5-tetrakis(fluoroalkyl)-3-oxazolines and 4 - isocyanato-2,2,5,5-tetrakis(fluoroalkyl)-3-imidazolines are prepared by the reaction of the corresponding 4 - amino - heterocyclic compounds with a phosgenating agent such as oxalyl chloride. The phosgenation reaction is accomplished without solvent or in an inert solvent at ambient or slightly elevated temperatures. Preferably, a mole to mole ratio of the amino-heterocyclic compound and oxalyl chloride is used. The reaction is conducted under essentially anhydrous conditions. The phosgenation process, which is applicable to the imidazolines and oxazolines, is described in Examples D and E and in U.S. Pat. 3,410,866.

The fluoroketimines of Formula V used in the above-described process are prepared in various ways. Imines wherein Z, $Z^1$, $Z^2$ and $Z^3$ are fluorine or chlorine can be prepared as shown in U.S. Pat. 3,226,439 and in W. J. Middleton and C. G. Krespan, J. Org. Chem., 30, 1398 (1965). Fluoroketimines where Z, $Z^1$, $Z^2$ and $Z^3$ are hydrogen can be prepared by a modification of the method for preparing hexafluoroisopropylidenimine, Zeifman et al., Akad. nauk. S.S.S.R. Doklady, 153, 1334 (1963). This process consists of reacting pentafluoroacetone with phenyl isocyanate at about 200° C. in the presence of a catalytic amount of a triarylphosphine oxide followed by the reaction with ammonia which results in N-phenyl-2,2-diaminopentafluoropropane. This product, which is not necessarily isolated, is heated with phosphorus pentoxide with the formation of the fluoroketimine, pentafluoroisopropylidenimine. This process is described in greater detail in Example E and in U.S. Pat. 3,342,864.

The fluoroketones IV are well-known materials and have been described in Lovelace, Rausch and Postelnek, "Aliphatic Fluorine Compounds," Reinhold Publishing Corporation, New York (1958), pp. 190–192.

Carbonyl and thiocarbonyl-containing compounds used as the coreactant are well-known compounds, many of which are commercially available.

Carbonyl and thiocarbonyl-containing compounds useful in the process for preparing the compounds of Formula I include:

acetaldehyde
thioacetaldehyde
propanal
thiopropanal
butanal
dodecanal
thiododecanal
octadecanal
thiododecanal
β-naphthaldehyde
α-thionaphthaldehyde
phenylacetaldehyde
o-tolualdehyde
α-phenylpropionaldehyde
2,3,5,6-tetramethylbenzaldehyde
2,4,6-triethylbenzaldehyde
p-n-propylbenzaldehyde
thiophenylacetaldehyde
p-thiotolualdehyde
p-dimethylaminobenzaldehyde
p-methoxybenzaldehyde
p-ethoxybenzaldehyde
p-methoxythiobenzaldehyde
4-methoxy-1-naphthaldehyde
4-dimethylamino-1-naphthaldehyde
methyl N,N-dimethylcarbamate
ethyl N,N-diethylcarbamate
octadecyl N,N-dimethylcarbamate
ethyl N,N-dibutylcarbamate
4,4'-dimethoxybenzophenone
ethyl-p-methoxyphenyl thioketone
hexyl-p-methoxyphenyl ketone
decyl-4-methoxyphenyl ketone
methyl-1-(4-methoxy)naphthyl ketone
methyl-1-(4-hexoxy)naphthyl ketone
4-methoxy thiobenzophenone
4-dimethylaminobenzophenone 4-methoxy-4-dimethylaminobenzophenone
4,4'-bis(dimethylamino)benzophenone
1-(4-methoxy)naphthylmethyl ketone
naphthyl-p-methoxyphenyl ketone
4,4'-dimethylaminophenyl thioketone
methyl formate
dodecyl formate
heptadecyl formate
methyl acetate
methyl thioacetate
butyl thioacetate
butyl acetate
dodecyl acetate
dodecyl butyrate
hexadecyl acetate
dodecyl hexanoate
methyl benzoate
ethyl thiobenzoate
butyl benzoate
octyl benzoate
decyl benzoate
undecyl benzoate
α-napthyl α-naphthoate
hexadecyl N,N-dimethylcarbamate
hexadecyl 4-dimethylamino-1-naphthoate
4-dimethylaminonaphthyl butyrate
α-naphthyl benzoate
benzyl benzoate
p-methylphenyl benzoate
benzyl phenylacetate
methyl p-dimethylaminobenzoate
methyl m-diethylaminobenzoate
N,N-dimethylbenzamide
N,N-dimethylphenylacetamide
N,N-dimethyl-p-dimethylaminophenylacetamide
N,N-dimethyl-p-methoxyphenylacetamide
N,N-dimethylthiobenzamide
N,N-dimethylthiophenylacetamide and the like. Other carbonyl and thiocarbonyl-containing compounds are shown below in the examples.

EMBODIMENTS OF THE INVENTION

The following examples further illustrate the invention. Unless otherwise specified, temperatures and pressures in these examples were ambient. Tautomeric forms of the imidazoline compounds are sometimes omitted from structural formulas. Examples A–F illustrate the preparation of the isocyanato intermediates for the Schiff bases of this invention.

EXAMPLE A 4-amino-2,2,5,5-tetrakis(trifluoromethyl)-3-oxazoline

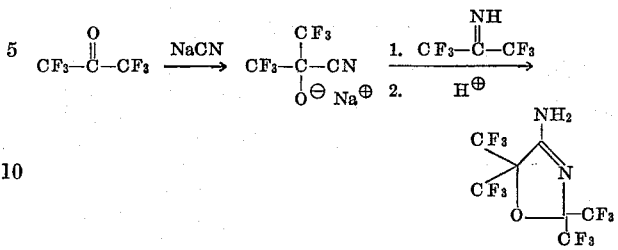

Hexafluoroacetone, 25 ml. at −78° C. (ca. 0.25 mole), was slowly distilled over a period of 30 min. into a stirred suspension of 12.25 g. (0.25 mole) of powdered sodium cyanide in 200 ml. of acetonitrile. The temperature of the reaction rose spontaneously to 60° C. The reaction mixture was stirred for an additional 30 min., and then cooled to 25° C. Hexafluorosiopropylidenimine, 27 ml. at −10° C. (ca. 0.25 mole), was then distilled into the reaction mixture, and the mixture was stirred for 3 days at room temperature. An equal volume of water was added, and the mixture was neutralized with 10% aqueous hydrochloric acid. The organic layer that formed was separated and shaken with water until a solid formed. The solid was collected on a filter, washed with water, recrystallized from benzene, and then submitted at 130° C. and 10 mm. to give 33.0 g. (37% yield) of 4-amino-2,2,5,5-tetrakis(trifluoromethyl) - 3 - oxazoline as colorless crystals, M.P. 136–138° C. (sealed capillary). The infrared spectrum showed a band at 5.89μ. The H$^1$ N.M.R. spectrum in (CD$_3$)$_2$CO at 25° C. showed a broad singlet at 7.66 p.p.m., and at −50° showed two singlets of equal area at 8.00 and 7.75 p.p.m. lower field from (CH$_3$)$_4$Si. The F$^{19}$ N.M.R. spectrum in (CD$_3$)$_2$SO showed two septets (J=5.9 c.p.s.) centered at 72.0 and 77.1 p.p.m. higher field from trichlorofluoromethane.

*Analysis.*—Calcd. for C$_7$H$_2$F$_{12}$N$_2$O (percent): C, 23.47; H, 0.56; F, 63.67; N, 7.83. Found (percent): C, 23.88; H, 0.77; F, 64.11; N, 7.89.

Perfluoroisopropylidenimine and substituted fluoroisopropylidenimines can be prepared by the procedure described in Example III of U.S. Pat. 3,226,439.

Among the 4 - amino-2,2,5,5-tetrakis(fluoroalkyl) - 3-oxazolines which can be prepared by the procedure of Example A are those listed in Table I. The reactants are listed in the left-hand columns of the table and the product is listed in the right-hand column.

TABLE I

| Reactants | | | Product oxazolines (or tautomer) |
|---|---|---|---|
| Ketone | Cyanide | Imine | |
| CF$_3$—C(=O)—CF$_3$ | KCN | ClCF$_2$—C(=NH)—CF$_2$Cl | 4-NH$_2$, 5,5-(CF$_3$)$_2$, 2,2-(CF$_2$Cl)$_2$ oxazoline |
| ClCF$_2$—C(=O)—CF$_2$Cl | NaCN | CF$_3$—C(=NH)—CF$_3$ | 4-NH$_2$, 5,5-(ClCF$_2$)$_2$, 2,2-(CF$_3$)$_2$ oxazoline |
| ClCF$_2$—C(=O)—CF$_3$ | NaCN | CF$_3$—C(=NH)—CF$_2$H | 4-NH$_2$, 5-CF$_3$, 5-ClCF$_2$, 2-CF$_3$, 2-CF$_2$H oxazoline |

TABLE I—Continued

| Reactants | | | Product oxazolines (or tautomer) |
|---|---|---|---|
| Ketone | Cyanide | Imine | |
| ClCF$_2$—CO—CF$_2$Cl | KCN | ClCF$_2$—C(=NH)—CF$_2$Cl | 2-amino oxazoline with ClCF$_2$, ClCF$_2$, CF$_2$Cl, CF$_2$Cl substituents |
| HCF$_2$—CO—CF$_2$H | NaCN | HCF$_2$—C(=NH)—CF$_2$H | oxazoline with HCF$_2$, HCF$_2$, CF$_2$H, CF$_2$H |
| HCF$_2$COCF$_2$Cl | NaCN | CF$_3$COCF$_3$ | oxazoline with ClCF$_2$, HCF$_2$, CF$_3$, CF$_3$ |
| CF$_3$COCF$_3$ | NaCN | CF$_3$COCF$_2$Cl | oxazoline with CF$_3$, CF$_3$, CF$_2$Cl, CF$_3$ |
| CF$_3$COCF$_2$H | NaCN | CF$_3$—C(=NH)—CF$_3$ | oxazoline with CF$_3$, HCF$_2$, CF$_3$, CF$_3$ |
| HCF$_2$—CO—CF$_3$ | NaCN | HCF$_2$—C(=NH)—CF$_3$ | oxazoline with CF$_3$, HCF$_2$, CF$_3$, CF$_2$H |
| CF$_3$—CO—CF$_3$ | NaCN | HCF$_2$—C(=NH)—CF$_3$ | oxazoline with CF$_3$, CF$_3$, CF$_3$, CF$_2$H |
| HCF$_2$—CO—CF$_2$H | NaCN | CF$_3$—C(=NH)—CF$_3$ | oxazoline with HCF$_2$, HCF$_2$, CF$_3$, CF$_3$ |

EXAMPLE B 4-(2-amino - 1,1,1,3,3,3 - hexafluoropropylamino)-2,2,5,5 - tetrakis(trifluoromethyl) - 3 - imidazoline and its tautomer

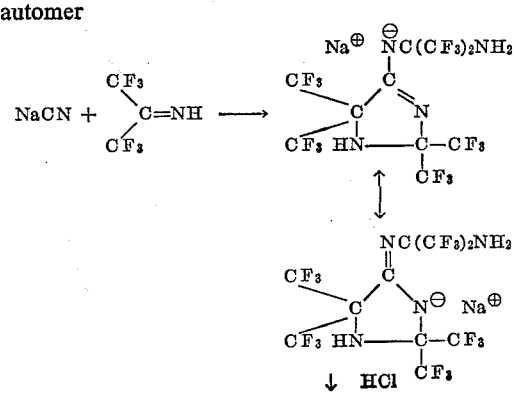

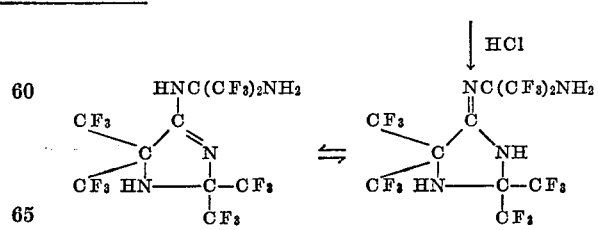

Part A.—Hexafluoroisopropylidenimine, 20 ml. at −10° C. (ca. 30.8 g., 0.187 mole), was slowly distilled into a stirred suspension of 3.06 g. (0.0625 mole) of powdered sodium cyanide in 50 ml. of dimethyl sulfoxide. An exothermic reaction ensued. The rate of addition of the ketimine was adjusted so that the temperature of the reaction mixture did not rise above 65° C. At the end of the addition, about 20 minutes being required, the reaction mixture became homogeneous. The mixture was cooled to 20° C. and then poured into 500 ml. of water containing 100 ml. of 10% hydrochloric acid. The oil that formed was separated by decanting the aqueous phase. Fresh water (500 ml.) was added, and the oil and water were shaken vigorously together. The oil solidified. This solid was collected on a filter and pressed dry, and then dried in a vacuum desiccator over phosphorus pentoxide. There was obtained 24.1 g. (74% of theory) of 4-[2-amino - 1,1,1,3,3,3-hexafluoropropylamino]-2,2,5,5-tetrakis(trifluoromethyl) - 3 - imidazoline as a hydrophobic white solid, M.P. 45–46° C. A sample was recrystallized from pentane for analysis. The $F^{19}$ N.M.R. spectrum in amino - 1,1,1,3,3,3 - hexafluoropropylamino]-2,2,5,5-tetra-$CDCl_3$ showed two septets ($J=5.0$ c.p.s.) centered at 72.8 and 77.9 p.p.m. from trichlorofluoromethane used as an internal standard and a singlet at 79.8 p.p.m. all of equal area. The proton N.M.R. spectrum in $CDCl_3$ showed two very broad singlets at 5.55 and 3.57 p.p.m. (each, area 1) and a borad singlet at 3.08 p.p.m. (area 2) from tetramethylsilane used as an internal standard. The infrared spectrum showed a band at $5.97\mu$.

Analysis.—Calcd. for $C_{10}H_4F_{18}N_4$ (percent): C, 23.00; H, 0.77; F, 65.49. Found (percent): C, 23.21; H, 0.91; F, 65.23.

Parts B.—4-amino - 2,2,5,5 - tetrakis(trifluoromethyl)-3-imidazoline and its tautomer.

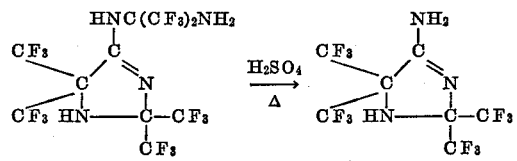

4 - [2 - amino - 1,1,1,3,3,3 - hexafluoropropylamino]-2,2,5,5 - tetrakis(trifluoromethyl) - 3 - imidazoline, 47.1 g., prepared as described in Part A above, was dissolved in 100 ml. of concentrated sulfuric acid, and the stirred solution was heated slowly to 150° C. and held at that temperature for 10 minutes. Frothing occurred during the heating period. The solution was then cooled to 20° C. and poured over 1 liter of crushed ice. The white solid that formed was collected on a filter after the ice had melted, and was washed with water. Recrystallization from alcohol-water (1:2) gave 31.5 g. (98% yield) of 4-amino - 2,2,5,5 - tetrakis(trifluoromethyl)-3-imidazoline or its tautomer as long, colorless needles, M.P. 158–159° C.

EXAMPLE C 4-amino-2,2,5,5-tetrakis(trifluoromethyl)-3-imidazoline or its tautomer This example illustrates the removal of the polyfluoropropylamino substituent from the intermediate, i.e., step 2 of the process, by heating the reaction mixture of the first step during distillation at atmospheric pressure to eliminate solvent.

Hexafluoroisopropylidenimine (25 g., 0.15 mole) was slowly distilled into a stirred suspension of 10 g. (0.2 mole) of sodium cyanide in 50 ml. of acetonitrile. An exothermic reaction ensued. The mixture was cooled to keep the temperature below 35° C. After the addition, the reaction mixture was stirred for 30 minutes at room temperature, and then 50 ml. of water was added. The pH of the solution was adjusted to 7 by the addition of a small quantity of hydrochloric acid. The organic layer was separated, washed twice with water and dried with anhydrous magnesium sulfate. The liquid was removed by distillation at atmospheric pressure, and the solid residue was recrystallized twice from benzene using decolorizing charcoal. There was obtained 4.1 g. (15% of theory) of 4-amino - 2,2,5,5 - tetrakis(trifluoromethyl) - 3 - imidazoline as colorless needles, M.P. 159–160° C. The proton N.M.R. spectrum in dimethyl sulfoxide contained a broad singlet at +7.2 p.p.m. (area 2) and a sharp singlet at +6.06 p.p.m. (area 1). The $F^{19}$ N.M.R. spectrum in acetone contained a pair of septets ($J=4.7$ c.p.s.) at 71.5 and 76.5 p.p.m. from trichlorofluoromethane used as an internal standard. The infrared spectrum contained bands at 2.85, 2.9, 2.96, 3.04, 3.10, 3.16, 5.9 and $6.2\mu$. The very strong band at $5.9\mu$ indicates the 4-imino tautomer to be present in major amount.

Analysis.—Calcd. for $C_7HF_{12}N_3$ (percent): C, 23.55; H, 0.85; F, 63.85; N, 1.77. Found (percent): C, 23.77; H, 1.35; F, 64.05; N, 12.05.

Among the 4-amino - 2,2,5,5 - tetrakis(fluoroalkyl)-3-imidazolines which can be prepared by the procedures of Example B or C are those listed in Table II. The reactant ketimines are listed in the left-hand column and the products are listed in the right-hand column.

TABLE II

| Reactant ketimines | Product imidazolines (or tautomer) |
|---|---|
| $\underset{\text{CF}_3-\overset{\text{NH}}{\overset{\|}{\text{C}}}-\text{CF}_2\text{Cl}}{}$ | ClCF$_2$ group with NH$_2$, N ring, HN-CF$_2$, CF$_2$Cl, ClCF$_3$ |
| $\text{ClCF}_2-\overset{\text{NH}}{\overset{\|}{\text{C}}}-\text{CF}_2\text{Cl}$ | ClCF$_2$, ClCF$_2$, NH$_2$, N, HN-CF$_2$Cl, CF$_2$Cl |
| $\text{CF}_3-\overset{\text{NH}}{\overset{\|}{\text{C}}}-\text{CF}_2\text{H}$ | CF$_2$H, CF$_3$, NH$_2$, N, HN-CF$_2$H, CF$_3$ |
| $\text{CF}_3-\overset{\text{NH}}{\overset{\|}{\text{C}}}-\text{CF}_3+\text{CF}_2\text{Cl}-\overset{\text{NH}}{\overset{\|}{\text{C}}}-\text{CF}_2\text{Cl}$ | ClCF$_2$, ClCF$_2$, NH$_2$, N, HN-CF$_3$, CF$_3$ |

EXAMPLE D 4-isocyanato-2,2,5,5-tetrakis(trifluoromethyl)-3-imidazoline

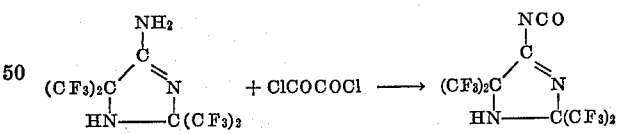

or tautomer.

A three-necked flask attached to the bottom of a spinning-band fractionating column was equipped with a magnetic stirrer, nitrogen inlet and dropping funnel. The equipment was flame-dried and cooled; then 15 ml. of oxalyl chloride and 75 ml. of anhydrous diethyl ether were introduced into the flask at ambient temperature under positive nitrogen pressure. To this a solution of 30 g. of 4 - amino - 2,2,5,5 - tetrakis(trifluoromethyl)-3-imidazoline (or its tautomer) dissolved in 100 ml. of ether was added over 30 minutes with vigorous stirring. After stirring an additional 20 minutes, the ether was removed by distillation at a moderate rate and the residue distilled at 75 mm. The product, 4 - isocyanato - 2,2,5,5 - tetrakis-(trifluoromethyl)-3-imidazoline, B.P. 78° C. (75 mm.), 25.7 g., was collected in oven-dried vails (as it reacts with moist air). The $H^1$ N.M.R. spectrum showed a singlet (broad) at 3.6 p.p.m. The $F^{19}$ N.M.R. spectrum showed a pair of septets ($J=5$) at +73.3 and +78.0 p.p.m. from external $FCCl_3$ at 56.4 mc.

Analysis.—Calcd. for $C_8HN_3OF_{12}$ (383.12) (percent): C, 25.08; H, 0.26; N, 10.96. Found (percent): C, 25.58; H, 0.77; N, 11.51.

EXAMPLE E

4-Isocyanato-2-(difluoromethyl)-2,5,5-tris(trifluoromethyl)-3-oxazoline

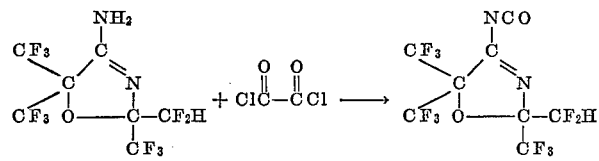

A solution of 15 g. of 4-amino-2-(difluoromethyl)-2,5,5-tris(trifluoromethyl)-3-oxazoline in 50 ml. of oxalyl chloride was heated at reflux for 2 days, and then distilled. There was obtained 11.21 g. of 4-isocyanato-2-(difluoromethyl)-2,5,5-tris(trifluoromethyl) - 3 - oxazoline as a colorless liquid. B.P. 65–67° C. (mostly 67° C.) (50 mm.). The H¹ N.M.R. spectrum of a heat sample showed a triplet ($J=53$ c.p.s.) split further to a quartet ($J=0.9$ c.p.s.) centered at $\tau$ 4.26. The F¹⁹ N.M.R. spectrum showed multiplets centered at 4166 c.p.s. (6F), 4406 c.p.s. (3F), and 7600 c.p.s. (2F) from CFCL₃ used as an external standard.

*Analysis.*—Calcd. for $C_8HF_{11}N_2O_2$ (percent): C, 26.25; H, 0.28; F, 57.09; N, 7.65. Found (percent): C, 26.51; H, 0.61; F, 57.02; N, 7.33.

EXAMPLE F

Pentafluoroisopropylidenimine

Part A.—A mixture of 71.4 g. (0.6 mole) of phenyl isocyanate, 92 g. (0.62 mole) of pentafluoroacetone and 10 g. of triphenylphosphine oxide was heated at 200° C. for 16 hours in a 400-ml. bomb. The bomb was cooled and vented, and the contents were distilled to give 75.6 g. (56% yield) of N-phenylpentafluoroisopropylidenimine as a light yellow oil, B.P. 59.6–60° C. (10 mm.), $n_D^{25}$ 1.4394.

Part B.—Ammonia, 21 ml. at −78° C. (ca. 1 mole) was slowly distilled into 74.3 g. (0.33 mole) of N-phenylpentafluoroisopropylidenimine contained in a flask cooled by an ice bath and connected to a Dry Ice-cooled condenser. The reaction mixture was allowed to reflux for 2 hours, and then stirred at room temperature overnight. The entire reaction mixture, ca. 60 ml., was mixed with 200 g. of phosphorus pentoxide contained in a flask connected to a simple distillation column. The flask was heated strongly to distill out the volatile products. The distillate was redistilled to give 26.1 g. (52% yield) of pentafluoroisopropylidenimine as a colorless liquid, B.P. 42.5° C., $n_D^{25}$ <1.3.

EXAMPLE I

4-[(dimethylamino)methylmethyleneamino]-2,2,5,5-tetrakis(trifluoromethyl)-3-imidazoline

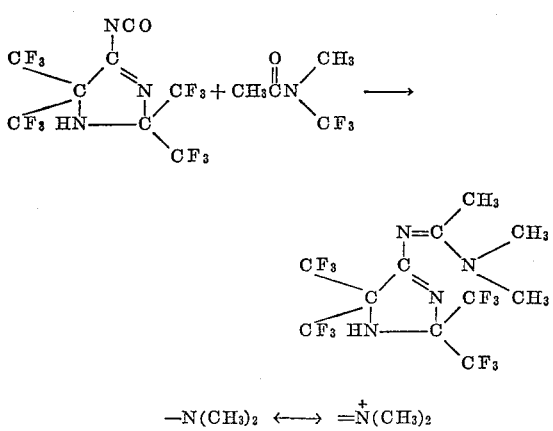

A 7-g. sample (0.02 mole) of 4-isocyanato-2,2,5,5-tetrakis(trifluoromethyl)-3-imidazoline (as its self-condensation product obtained by storing the isocyanate several days at 25° C. in a closed container) and 10 ml. (excess) of dry dimethylacetamide were heated at reflux under nitrogen for 16 hours. The excess dimethylacetamide was removed by distillation at 5 mm. The residue was short path-distilled giving 5.48 g. (75%), B.P. 90° C. (2 mm.) to 77° C. (0.2 mm.), M.P. 45–51° C. (heart fraction M.P. 48–51° C.) of 4-[(dimethylamino)methylmethyleneamino] - 2,2,5,5 - tetrakis(trifluoromethyl)-3-imidazoline. The H¹ N.M.R. spectrum showed absorptions: NH— at $\tau$ 4.28,

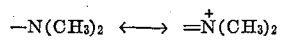

at $\tau$ 6.75 and 6.82, and

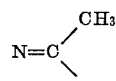

at $\tau$ 7.60. The F¹⁹ N.M.R. spectrum showed a pair of septets ($J=4$ c.p.s.) at +4112.5 and +4391 c.p.s. from external FCCl₃ at 56.4 mc. The ultraviolet spectrum showed $\lambda_{max.}^{ethanol}$ at 276 m$\mu$($\epsilon$=21,300)

and the mass spectrum showed a parent ion at m/e 426 and the expected fragments.

*Analysis.*—Calcd. for $C_{11}H_{10}N_4F_{12}$ (426.22) (percent): C, 30.67; H, 2.36; N, 13.14. Found (percent): C, 30.83; H, 2.55; N, 12.95.

EXAMPLE II

4-[(dimethylamino)methyleneamino]-2,2,5,5-tetrakis(trifluoromethyl)-3-imidazoline

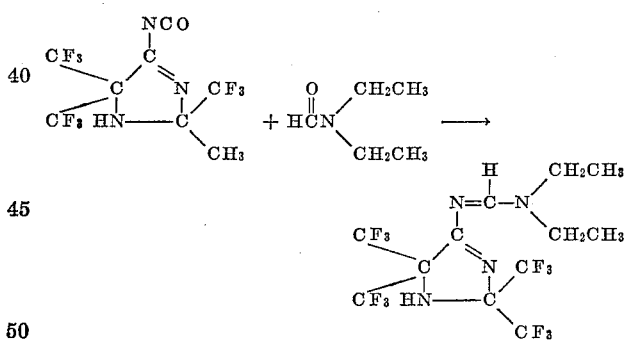

A 7-g. (0.02 mole) sample of 4-isocyanato-2,2,5,5-tetrakis(trifluoromethyl) - 3 - imidazoline (as its self-condensation polymer) and 10 g. (excess) of dry diethylformamide were heated together under a nitrogen atmosphere at 160° C. for one hour. The excess diethylformamide was removed under reduced pressure and the residue vacuum sublimed. A total of 4.3 g. (49%) of 4-[(diethylamino)methyleneamino] - 2,2,5,5 - tetrakis (trifluoromethyl) - 3 - imidazoline, M.P. 59–63° C., was obtained. The H¹ N.M.R. spectrum showed absorptions: methylene as two overlapping quartets ($Js=7$ c.p.s.) at at $\tau$ 6.38 and methyls at $\tau$ 8.69 (triplet, $J=7$ c.p.s.) and $\tau$ 8.80 (triplet, $J=7$ c.p.s.) due to the presence of

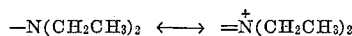

NH— bands appeared at $\tau$ 1.4 and 4.3. The F¹⁹ N.M.R. spectrum showed a pair of septets ($J=4.5$ c.p.s.) at +4118 and +4394 c.p.s. from external FCCl₃ at 46.4 mc.

*Analysis.*—Calcd. for $C_{12}H_{12}N_4F_{12}$ (440.25) (percent): C, 32.73; H, 2.75; N, 12.73; F, 51.79. Found (percent): C, 32.59; H, 2.98; N, 12.60; F, 51.36.

EXAMPLE III

4 - [p-(dimethylamino)phenylmethyleneamino] - 2,2,5,5-tetrakis(trifluoromethyl)-3-imidazoline

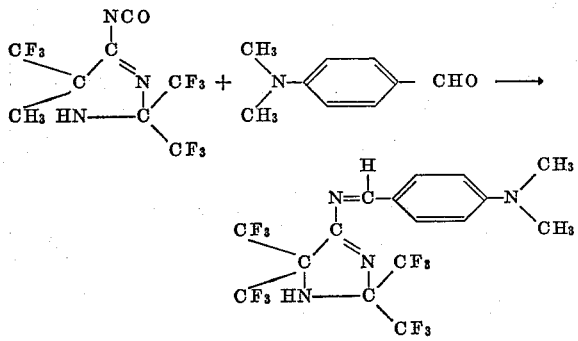

A 7.66-g. (0.020 mole) sample of 4-isocyanato-2,2,5,5-tetrakis(trifluoromethyl)-3-imidazoline (as its self-condensation polymer) and 3.98 g. (0.020 mole) of p-dimethylaminobenzaldehyde were heated at reflux under nitrogen for one hour. Vacuum sublimation gave 6.6 g. (68%) of an orange solid, M.P. 138–142° C., 4-[p-(dimethylamino)phenylmethyleneamino] - 2,2,5,5-tetrakis (trifluoromethyl) - 3 - imidazoline. The $H^1$ N.M.R. spectrum showed a singlet at $\tau$ 1.03 for =CH—, an aromatic AA′BB′ pattern with halves centered at $\tau$ 2.05 and 3.15, NH at $\tau$ 3.70 and $N(CH_3)_2$ at $\tau$ 6.86. The $F^{19}$ N.M.R. spectrum showed a pair of septets ($J=5$ c.p.s.) at $+4098$ and $+4367$ c.p.s. from external $FCCl_3$ at 56.4 mc.

*Analysis.*—Calcd. for $C_{16}H_{12}N_4F_{12}$ (488.29) (percent): C, 39.35; H, 2.46; N, 11.48; F, 46.69. Found (percent): C, 39.69; H, 2.91; N, 11.71; F, 46.84.

EXAMPLE IV

4 - [bis(p - dimethylaminophenyl)methyleneamino]-2,2,5,5-tetrakis(trifluoromethyl)-3-imidazoline

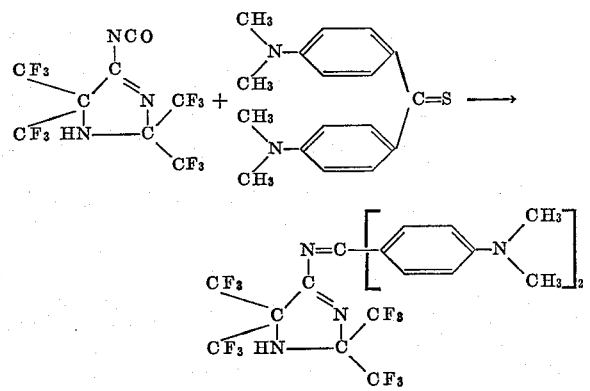

A 7.66-g. (0.020 mole) sample of 4-isocyanato-2,2,5,5-tetrakis(trifluoromethyl)-3-imidazoline (as its self-condensation polymer) and 5.68 g. (0.020 mole) of 4,4′-bis (dimethylamino)thiobenzophenone and 20 ml. of dry dimethyl ether of diethylene glycol (diglyme) were heated at reflux for one hour under nitrogen. Removal of the solvent by distillation and vacuum sublimation of the residue led to 9.2 g. (77%) of red, solid 4-[bis(p-dimethylaminophenyl)methyleneamino] - 2,2,5,5-tetrakis-(trifluoromethyl)-3-imidazoline, M.P. 188–192° C. The $H^1$ N.M.R. spectrum showed an aromatic $A_2B_2$ pattern with halves at $\tau$ 2.44 and 3.30 (area 4:4), NH at $\tau$ 3.95 (area 1) and $N(CH_3)_2$ at $\tau$ 6.98 (area 12). The $F^{19}$ N.M.R. spectrum showed a pair of septets ($J=45$ c.p.s.) at $+4070$ and $+4351$ c.p.s. from external $FCCl_3$ at 56.4 mc.

*Analysis.*—Calcd. for $C_{24}H_{21}N_5F_{12}$ (607.45) (percent): C, 47.45; H, 3.49; N, 11.54; F, 37.5. Found (percent): C, 47.56; H, 3.34; N, 11.57; F, 37.55.

EXAMPLE V

4-[(ethoxy)phenylmethyleneamino]-2,2,5,5-tetrakis(trifluoromethyl)-3-imidazoline

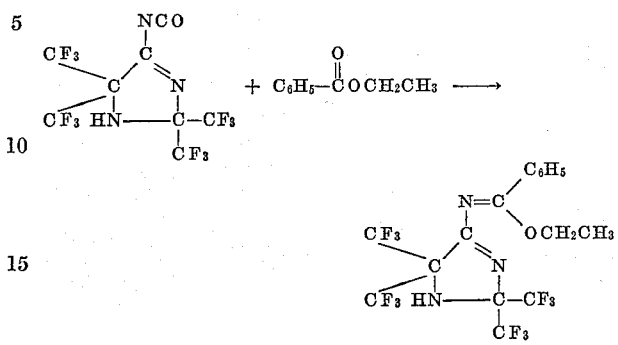

A 5-g. sample of 4-isocyanato-2,2,5,5-tetrakis(trifluoromethyl)-3-imidazoline solid condensation product was refluxed (212° C.) with 20 g. (excess) of ethyl benzoate for 3 days. The excess diethyl benzoate was removed by distillation and the residue distilled through a spinning-band column. The fractions boiling at 80° C. (0.3 mm.) to 78° C. (0.25 mm.), 1.7 g. (26%), were the desired product 4 - [(ethoxy)phenylmethyleneamino] - 2,2,5,5-tetrakis (trifluoromethyl)-3--imidazoline; this material solidified on standing, M.P. 37–42° C. The $H^1$ N.M.R. spectrum showed aromatic —H centered at $\tau$ 2.3, NH at $\tau$ 3.67, a $OCH_2C_3$ quartet ($J=7$) at $\tau$ 5.45, and a $OCH_2CH_3$ triplet ($J=7$) at $\tau$ 8.54. The $F^{19}$ N.M.R. spectrum showed a pair of septets ($J=5$) at $+4094$ and $+4350$ c.p.s. (external $FCCl_3$ at 56.4 mc.).

*Analysis.*—Calcd. for $C_{16}H_{11}N_3F_{12}O$ (489.27) (percent): C, 39.28; H, 2.26; N, 8.59; F, 46.6. Found (percent): C, 39.03; H, 2.43; N, 8.54; F, 46.58.

EXAMPLE VI

4-[(dimethylamino)methyleneamino]-2,2,5,5-tetrakis(trifluoromethyl)-3-imidazoline

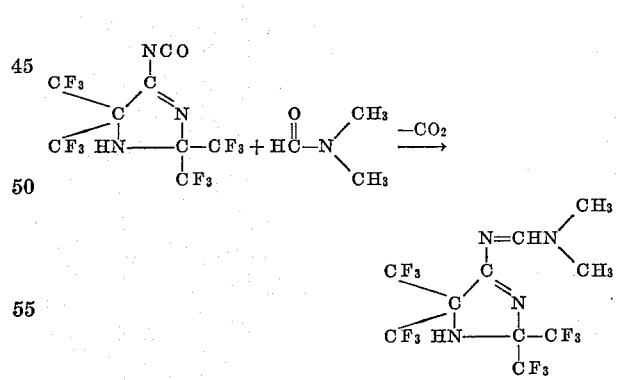

A 6-g. sample of 4-isocyanato-2,2,5,5-tetrakis(trifluoromethyl)-3-imidazoline (self-condensation product) and 10 g. of purified dimethylformamide (DMF) were heated for 2 hours at reflux and the mixture was distilled through a spinning-band column. After the excess DMF was removed the product sublimed into the column. The solid in the pot was washed with pentane giving 2.26 g. of product, 4-[(dimethylamino)methyleneamino]-2,2,5,5-tetrakis(trifluoromethyl)-3-imidazoline. A sample for characterization was obtained by recrystallization from ether-pentane, M.P. 113–115° C. The procedure was repeated on a scale three times as large, except that the excess DMF was removed by distillation under reduced pressure and the residue vacuum sublimed, giving 16.15 g. (84%) of purified product. The $H^1$ N.M.R. spectrum (CCl₃D) showed a doublet (J=2.7) split further in doublets (J=0.6) centered at τ 6.85 (area 6);

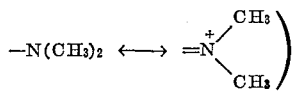

NH at τ 6.5 and N=CH—N< at τ 1.5 The F¹⁹ N.M.R. spectrum showed a pair of septets (J=6) at +4064 and +4350 c.p.s. from external FCCl₃. The mass spectrum showed the parent at m/e 412 and the expected fragmentation; the base peak was m/e 343 (parent —CF₃). The ultraviolet spectrum showed $\lambda_{max.}^{CH_3CN}$ 281 mμ(ε=23,800), $\lambda_{max.}^{ethanol}$ 280 mμ(ε=22,700)

*Analysis.*—Calcd. for C₁₀H₈N₄F₁₂ (412.19) (percent): C, 29.13; H, 1.96; N, 13.60; F, 55.31. Found (percent): C, 29.50; H, 1.87; N, 14.28; F. 54.98.

On boiling for a few minutes with 3 N hydrochloric acid, this Schiff base regenerates the imidazoline.

EXAMPLE VII

4-[bis(dimethylamino)methyleneamino]-2,2,5,5-tetrakis(trifluoromethyl)-3-imidazoline

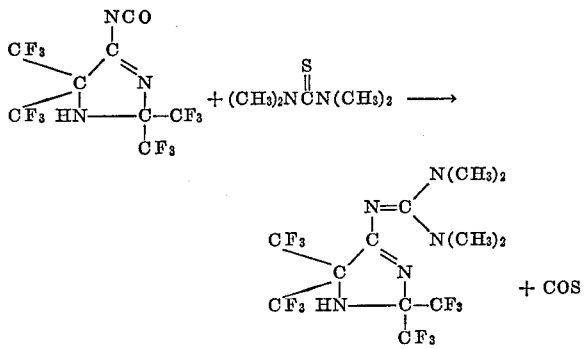

A 6-g. sample of the isocyanate (self-condensation product of 4-isocyanato-2,2,5,5-tetrakis(trifluoromethyl)-3-imidazoline) and 2.10 g. (one equiv.) of tetramethylthiourea were heated together at reflux for one hour. Sublimation gave 2.6 g. (36%) of product 4-[bis(dimethylamino)methyleneamino] - 2,2,5,5 - tetrakis(trifluoromethyl)-3-imidazoline, M.P. 121–129° C. The H¹ N.M.R. spectrum showed NH at τ 4.55 and 4 CH₃'s at τ 7.02. The F¹⁹ N.M.R. spectrum showed a pair of septets (J=5) at +4087 and +4401 c.p.s. from external FCCl₃ at 56.4 mc. The ultraviolet spectrum showed $\lambda_{max.}^{CH_3CN}$ 262 mμ(ε=18,000)

The mass spectrum showed a parent ion at m/e 455 and the expected fragmentation.

*Analysis.*—Calcd. for C₁₂H₁₃N₅F₁₂ (455.26) (percent): C, 31.65; H, 2.88; N, 15.38. Found (percent): C, 31.89; H, 2.92; N, 15.11.

EXAMPLE VIII 4-(benzylideneamino)-2,2,5,5-tetrakis(trifluoromethyl)-3-imidazoline

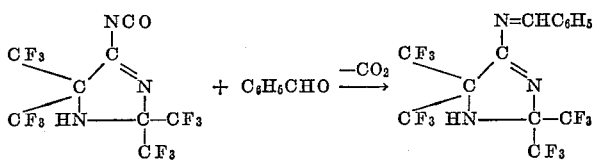

A 5.75-g. (0.015 mole) sample of 4-isocyanato-2,2,5,5-tetrakis(trifluoromethyl)-3-imidazoline was heated at reflux for 0.5 hour under a nitrogen atmosphere with 10 g. of benzaldehyde (excess). The reaction mixture was distilled through a spinning-band column. The fractions boiling at 95–98° C. (1.6 mm.) solidified on standing, yielding 3.5 g. of 4-(benzylideneamino)-2,2,5,5-tetrakis(trifluoromethyl)-3-imidazoline. A scaled-up reaction using 30 g. of isocyanate and 50 g. of benzaldehyde gave 28 g. (80%) of benzylidene product, B.P. 91° C. (100 mm.) The F¹⁹ N.M.R. spectrum showed a pair of multiplets at +4103 and +4397 c.p.s. from FCCl₃ at 56.4 mc. The H¹ N.M.R. spectrum showed a multiplet in the aromatic region and an NH band at τ 3.6. The ultraviolet spectrum showed $\lambda_{max.}^{CH_3CN}$ 235 mμ(ε=5250), 245 mμ(ε=4580),
273 mμ(ε=605), 280 mμ(ε=596)

This compound is very easily hydrolyzed to a mixture of 4 - amino-2,2,5,5,-tetrakis(trifluoromethyl) - 3 - imidazoline and benzaldehyde (minute amounts of benzoic acid present in the product catalyze this decomposition); it seems probable that the spectral properties reported above may be due to the hydrolysis mixture and not the benzylidene product. The infrared spectrum (Nujol) of the freshly prepared adduct is quite different from the one-to-one mixture of 4-amino-2,2,5,5-tetrakis(trifluoromethyl)-3-imidazoline and benzaldehyde. In addition, benzaldehyde may be removed from the mixture by washing with pentane, while the adduct is not decomposed by this treatment.

*Analysis.*—Calcd. for C₁₄H₇N₃F₁₂ (445.22) (percent): C, 37.76; H, 1.59; N, 9.44; F, 51.2. Found (percent): C, 36.88; H, 1.64; N, 9.27; F, 51.45.

EXAMPLE IX

4-[(dimethylamino)methyleneamino]-2-difluoromethyl-2,5,5-tris(trifluoromethyl)-3-oxazoline

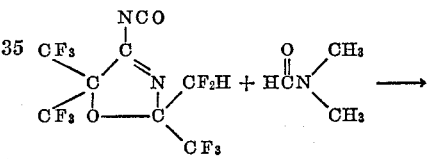

A 3.1-g. sample of 4-isocyanato-2-(difluoromethyl)-2,5,5-tris(trifluoromethyl)-3-oxazoline was refluxed under a nitrogen atmosphere with 10 ml. of dry dimethylformamide (excess). The excess dimethylformamide was removed by distillation through a spinning-band column under reduced pressure. The residue was dissolved in ether and washed with water, dried over sodium sulfate and the ether esaporated. A white solid Schiff base, M.P. 44.5–45.5° C., 1.8 g. (57%), was obtained. The infrared spectrum showed no isocyanate bands and was consistent with the assigned structure. The H¹ N.M.R. spectrum showed absorptions at τ 6.80, 6.85 for the methyl groups, a triplet at τ 4.15 (J=54 c.p.s.) for the —CF₂H group, and a singlet at τ 1.49 for the

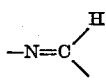

group. The F¹⁹ N.M.R. spectrum showed a doublet (split further) at +7445 c.p.s. (J=54 c.p.s.) for the —CF₂H group, a multiplet at +4133 c.p.s. for the —C(CF₃)₂ group and a triplet (J=9 c.p.s.) at 4366 c.p.s. for the

group (internal FCCl₃ at 54.6 mc.). The ultraviolet spectrum showed λₘₐₓ. 283 mμ (ε=24,200).

*Analysis.*—Calcd. for $C_{10}H_8F_{11}N_3O$ (395.18) (percent): C, 30.39; H, 2.04; N, 10.63; F, 52.9. Found (percent): C, 30.00; H, 2.92; N, 10.70; F, 52.58.

The examples have illustrated the products of this invention by reference to specific compounds. However, the invention includes all compounds having the general Formula I. Other specific Schiff bases of 4-amino-2,2,5,5-tetrakis(fluoroalkyl)-3-imidazolines and -3-oxazolines included in this invention are listed in column 3 of Table III. These can be prepared by the methods of Examples I–IX by substituting the specific isocyanate compound and specific carbonyl or thiocarbonyl compound listed in the first two columns of this table for the reactants employed in Examples I–IX.

TABLE III

| Reactants | | |
|---|---|---|
| Isocyanate compound | Carbonyl or thiocarbonyl compound | Product Schiff bases |
| (CF$_3$)$_2$C ring with NCO, HN—C—CF$_3$, CF$_2$H | O=CH$_2$ | (CF$_3$)$_2$C ring with N=CH$_2$, HN—C—CF$_3$, CF$_2$H |
| CF$_3$, HCF$_2$ ring with NCO, HN—C—CF$_3$, CF$_2$H | O=CH—C$_6$H$_{13}$ | CF$_3$, HCF$_2$ ring with N=CH—C$_6$H$_{13}$, HN—C—CF$_3$, CF$_2$H |
| (HCF$_2$)$_2$C ring with NCO, HN—C(CF$_2$H)$_2$ | O=C(CH$_3$)(C$_6$H$_4$OCH$_3$) | (HCF$_2$)$_2$C ring with N=C(CH$_3$)(C$_6$H$_4$OCH$_3$), HN—C(CF$_2$H)$_2$ |
| CF$_3$, ClCF$_2$ ring with NCO, HN—C(CF$_3$)$_2$ | O=CH—α-C$_{10}$H$_7$ | CF$_3$, ClCF$_2$ ring with N=CH—α-C$_{10}$H$_7$, HN—C(CF$_3$)$_2$ |
| CF$_3$, ClCF$_2$ ring with NCO, HN—C—CF$_3$, CF$_2$Cl | S=C[C$_6$H$_4$N(C$_4$H$_9$)$_2$]$_2$ | CF$_3$, ClCF$_2$ ring with N=C[C$_6$H$_4$N(C$_4$H$_9$)$_2$]$_2$, HN—C—CF$_3$, CF$_2$Cl |
| (ClCF$_2$)$_2$C ring with NCO, HN—C(CF$_2$Cl)$_2$ | O=HCN(CH$_3$)$_2$ | (ClCF$_2$)$_2$C ring with N=CH—N(CH$_3$)$_2$, HN—C(CF$_2$Cl)$_2$ |
| (CF$_3$)$_2$C ring with NCO, O—C(CF$_3$)$_2$ | S=C[N(C$_4$H$_9$)$_2$]$_2$ | (CF$_3$)$_2$C ring with N=C[N(C$_4$H$_9$)$_2$]$_2$, O—C(CF$_3$)$_2$ |
| HCF$_2$, CF$_3$ ring with NCO, O—C(CF$_3$)$_2$ | p-CH$_3$C$_6$H$_4$COOC$_2$H$_5$ | HCF$_2$, CF$_3$ ring with N=C(C$_6$H$_4$CH$_3$-p)(OC$_2$H$_5$), O—C(CF$_3$)$_2$ |

TABLE III—Continued

| Reactants | | Products Schiff bases |
|---|---|---|
| Isocyanate compound | Carbonyl or thiocarbonyl compound | |

[Structure: isocyanate with NCO, HCF₂, CF₃, O, C–CF₂H, CF₃] + C₂H₅C(O)N(C₂H₅)₂ → [Schiff base with N=C(C₂H₅)N(C₂H₅)₂, HCF₂, CF₃, O, C–CF₂H, CF₃]

[Structure: (HCF₂)₂C, NCO, O, C(CF₂H)₂] + C₆H₅CH₂C(O)N(CH₃)₂ → [Schiff base with N=C(CH₂C₆H₅)N(CH₃)₂, (HCF₂)₂C, O, C(CF₂H)₂]

[Structure: CF₃, NCO, ClCF₂, O, C(CF₃)₂] + S=C[C₆H₄N(CH₃)₂]₂ → [Schiff base with N=C[C₆H₄N(CH₃)₂]₂, CF₃, ClCF₂, O, C(CF₃)₂]

[Structure: (ClCF₂)₂C, NCO, O, C(CF₂Cl)₂] + C₆H₅–C(S)OC₄H₉ → [Schiff base with N=C(C₆H₅)OC₄H₉, (ClCF₂)₂C, O, C(CF₂Cl)₂]

The compounds of this invention, both the imidazoline and oxazoline Schiff bases, are useful for modifying polymers. They are especially effective in lowering the forming temperature or pressure of polymers. This is illustrated by the following experiments:

A sample of poly(methyl methacrylate) was melt pressed at 150° C., 7,000 p.s.i. for one minute. This gave a film of 9.5 mils thickness. A like amount of a mixture of 9 parts of this polymer and one part of 4-[p-(dimethylamino)phenylmethyleneamino] - 2,2,5,5 - tetrakis (trifluoromethyl)-3-imidazoline (the product of Example III) gave an orange-colored film of 3.25 mils thickness under the same pressing conditions. Pressing the above mixture at 135° C. and 7,000 p.s.i. for one minute, gave an orange-colored film of 5.5 mils thickness.

This also illustrates the usefulness of the colored Schiff bases of this invention as dyes.

The compounds of this invention are also useful as water- and oil-repellent coatings for cellulosic materials. This is illustrated by the following experiments: Samples of 4-[(dimethylamino)methyleneamino]-2,2,5,5-tetrakis(trifluoromethyl)-3-imidazoline and 4-[(p-dimethylaminophenyl)methyleneamino] - 2,2,5,5 - tetrakis(trifluoromethyl)-3-imidazoline were dissolved in acetone and poured onto strips of filter paper. After drying, the treated strips were found to be yellow-colored and water- and oil-repellent while untreated strips of the paper were wetted by oil and water immediately.

The utility of compounds of this invention in therapeutical applications is demonstrated by the effectiveness of the compounds as muscle relaxants.

The muscle relaxant properties of the compounds of this invention were demonstracted by use of the 30° Inclined Screen Test of L. O. Randall et al. [J. Pharm. Exp. Therap., 129, 163 (1960)]. By this test, is determined the oral doses which causes 50% of the test animals (mice) to lose their footing on a wire mesh which is inclined 30° from the horizontal. This dosage is called the "paralyzing doses₅₀" or PD₅₀ value. In this test, low PD₅₀ values indicate high potencies. 4-[(dimethylamino)methylyeneamino] - 2,2,5,5-tetrakis(trifluoromethyl) - 3 - imidazoline has a PD₅₀ value of 27 mg./kg. with a standard error of ±3.9 mg./kg.

Another method for demonstrating muscle relaxant activity is the Wire Lift Test wherein the forefeet of albino mice are placed on a taut wire stretched at a level of approximately 12″ over a flat surface. Normal animals grasp the wire and lift the hind feet to the wire, where balance is maintained. Inability to lift the hind legs to the wire is taken as a positive response and is considered to be a measure of muscle relaxation. Dose response relationships are determined by the method of L. C. Miller and M. L. Tainter, Proc. Soc. Exp. Biol. Med., 57, 261–264 (1944).

The following Table IV gives "effective doses₅₀" or ED₅₀ values for three compounds of this invention. Low ED₅₀ values indicate high potencies.

TABLE IV.—WIRE LIFT TEST FOR MUSCLE-RELAXANT ACTIVITY

| Name of Compound | ED₅₀ (mg./kg.) ±std. error |
|---|---|
| 4-[(dimethylamino)methyleneamino]-2, 2, 5, 5-tetrakis (trifluoromethyl)-3-imidazoline | 13.3±1.2 |
| 4-benzylideneamino)-2, 2, 4, 5-tetrakis (trifluoro methyl)-3-imidazoline | 16±1.4 |
| 4-[4-(dimethylamino)benzylideneamino]-2, 2, 5, 5-tetrakis(trifluoromethyl)-3-imidazoline | 37±5.6 |

The foregoing has been given for clarity of understanding only and no unnecessary limitations are to be understood therefrom. The invention is not limited to the exact details shown and described, for obvious modifications will be apparent to those skilled in the art.

The embodiments of the invention in which an exclusive property or privilege is claimed are defined as follows:

1. A Schiff base of the formula

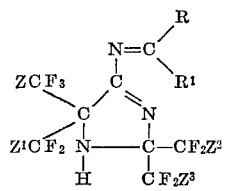

wherein
(A) R is selected from hydrogen and a monovalent radical containing at most 18 carbons selected from alkoxy, dialkylamino, dialkylaminophenyl, dialkylaminonaphthyl, alkoxyphenyl, and alkoxynaphthyl; and $R^1$ is selected from R and a monovalent radical containing at most 18 carbons selected from alkyl, phenyl, naphthyl, alkylphenyl, alkylnaphthyl, phenylalkyl, and naphthylalky;

(B) Z, $Z^1$, $Z^2$, and $Z^3$ can be the same or different and are selected from hydrogen, chlorine and fluorine.

2. The Schiff base of claim 1, wherein Z, $Z^1$, $Z^2$ and $Z^3$ are fluorine, R is dimethylamino and $R^1$ is methyl; said Schiff base being 4-[(dimethylamino)methylmethyleneamino] - 2,2,5,5 - tetrakis(trifluoromethyl) - 3 - imidazoline.

3. The Schiff base of claim 1 wherein Z, $Z^1$, $Z^2$ and $Z^3$ are fluorine, R is p-dimethylaminophenyl and $R^1$ is hydrogen, said Schiff base being 4-[p-(dimethylamino)phenylmethyleneamino] - 2,2,5,5 - tetrakis(trifluoromethyl)-3-imidazoline.

4. The Schiff base of claim 1 wherein Z, $Z^1$, $Z^2$ and $Z^3$ are fluorine, R is hydrogen and $R^1$ is phenyl, said Schiff base being 4-(benzylideneamino)-2,2,5,5-tetrakis(trifluoromethyl)-3-imidazoline.

References Cited
UNITED STATES PATENTS
2,915,376  12/1959  Raifsnider _____ 260—309.6
3,326,976  6/1967  Middleton.

OTHER REFERENCES
Layer: Chem. Rev., vol. 63, p. 496 relied on (1963).
Staudinger et al.: Berichte, vol. 50, pp. 1042–46 (1917).

NATALIE TROUSOF, Primary Examiner

U.S. Cl. X.R.
424—272, 273